United States Patent [19]

Rotaru

[11] 3,855,404
[45] Dec. 17, 1974

[54] PROCESS AND APPARATUS FOR THE CONTACTING OF TWO OR MORE PHASES

[75] Inventor: Cornel-Constantin N. Rotaru, Savinesti-Piatra Neamt, Romania

[73] Assignee: Centrala Industriala De Fibre Chimice, Savinesti, Romania

[22] Filed: Sept. 15, 1972

[21] Appl. No.: 289,223

[30] Foreign Application Priority Data
Sept. 24, 1971 Romania.............................. 68277

[52] U.S. Cl................. 423/659, 23/252 R, 23/260, 23/284, 23/285, 23/286, 23/288 E, 55/247, 259/5, 261/90
[51] Int. Cl........... B01f 3/04, B01f 7/14, B01j 1/00
[58] Field of Search............ 23/285, 288 E, 283 US, 23/284 US, 252 R, 286, 260; 55/230, 231, 232, 247; 259/5, 21, 40, 64, 111; 261/90, 92; 423/659, 659 F

[56] References Cited
UNITED STATES PATENTS
2,238,864 4/1941 Pratt et al..................... 23/252 R X
3,212,859 10/1965 Mitacek........................... 259/64 X
3,443,798 5/1969 Overcashier et al................. 259/102

*Primary Examiner*—Joseph Scovronek
*Assistant Examiner*—Barry I. Hollander
*Attorney, Agent, or Firm*—Karl F. Ross; Herbert Dubno

[57] ABSTRACT

A process for the continuous contacting of two or more phases, including gaseous phases, whereby planetary motion is effected in parallel vertical planes, extending over the entire horizontal length of the working zone. The invention also relates to the apparatus which has a horizontal cylindrical body, with horizontal planetary agitators (with one or several central driving shafts, with or without blades, each central shaft having one or several satellite shafts, with blades), and wherein the planetary gears are located within the body of the apparatus.

The apparatus may have an external circuit consisting of three parts: (1) A heat exchanger to supply or absorb heat; (2) A filter for the filtration and separation of the synthesized product, such as a static filter, and (3) A pump into which the gaseous phases are fed and which serves to return reactants back to the main housing.

The invention is applied to physical and chemical processes, especially in the presence of at least one gaseous phase. One of many possible examples in the application of the invention is exemplified by the catalytic snythesis of hydroxylamine from nitrogen oxides, etc. and hydrogen, in acid medium.

6 Claims, 2 Drawing Figures

PROCESS AND APPARATUS FOR THE CONTACTING OF TWO OR MORE PHASES

FIELD OF THE INVENTION

The invention relates to a process and an apparatus for the continuous contacting of two or more phases, which intensify the mass transfer in physical and chemical processes.

BACKGROUND OF THE INVENTION

Presently, numerous processes and apparatuses are known and used to perform mass transfer in physical and chemical processes by the contacting of two or more phases with one another. Some of these are mixers, evaporators, driers, absorbers and desorbers, and chemical reactors.

The main disadvantage of the above-mentioned conventional processes and apparatuses is their low productivity. The productivity, in general, is limited by the fact that the degree of contact which they accomplish is counteracted by parasitic processes of separation of phases and by limited mobility of the contact interfaces. Thus, for instance, in the case of agitators with central shafts, a separation of the phases appears even at relatively low rates of revolution because of centrifugal forces. This is especially the case when the particle masses differ significantly, as in gas — liquid — solid systems. In absorption columns, contact is limited by the flooding speeds. In drying in a fluidized bed, contact is limited by the critical speed of the drying agent.

Another disadvantage of the known processes and apparatuses for achieving phase contact resides in the fact that the hydrodynamic processes are not identical for all working volumes.

There exist, in particular, agitators with vertical shafts undergoing planetary motion in horizontal planes and driven by a central shaft by the means of a central wheel or of a peripheral crown gear. The gears are located outside the working zone. These agitators experience difficulties even in liquid-solid contacting when the respective particles possess significant mass differences, the vertical diffusion thereof being weak. However, the disadvantages become striking, if at least one gaseous phase is present, the separation of which, at the upper part, cannot be avoided. Therefore, the physical and chemical processes do not avail themselves of sufficiently large contact surfaces and extensive contact times.

SUMMARY OF THE INVENTION

The present invention relates to a continuous process and apparatus for the continuous contacting of two or more phases, which use planetary motion and planetary mechanisms for contacting the phases with one another and which eliminate the disadvantages of the known processes and apparatuses by achieving an intense mass transfer, in physical and chemical processes even in the presence of a gaseous phase.

The continuous process, according to the invention, achieves a continuous contacting of two or more phases by using a multitude of planetary motions, performed in parallel vertical planes, extended over the entire working zone, which is horizontally disposed.

The apparatus for the continuous contacting of phases, according to the invention, consists of a cylindrical body, provided with horizontal planetary agitators. The agitators are driven by one or more central shafts, with or without blades, each of these having one or more satellite shafts, provided with blades, the planetary gears being located within the cylindrical body, preferably at both ends.

The planetary gears include two satellite toothed wheels, secured to the ends of the satellite shafts, and of peripheral crown gears, with which the satellite wheels mesh, or of central toothed wheels, with which mesh the satellite toothed wheels.

The contacting apparatus has a cylindrical body disposed horizontally and having a circular cross section. The apparatus has only one central driving shaft, with or without blades, but with one or more satellite shafts provided with blades, according to necessity.

The blades may have one or several arms and may be distributed at equal distances along the satellite shafts. It is possible to arrange these blades in groups which are spaced out on the satellite shaft. The arms are regularly disposed so that every successive blade has its arms in a plane different from that of its neighbors.

The supply of heat to the apparatus or the removal of heat from the apparatus may be performed through hot and cold fluids, respectively, which act at the external part of the cylindrical body, possibly in a shell or jacket. However, the heat supply into or removal from the apparatus can also be performed externally, with a heat exchanger included in a fluid circuit. This circuit receives the mixture of phases which comes out at one end of the apparatus and re-enters at the other end. The circulation is ensured by a pump. Other operations as, for instance, filtration of the mixture of phases, in a static filter, can also be effected in this circuit. In the case of the presence in the system of at least one gaseous phase, these phases can be fed, totally or partially, in a Mammoth pump, located in the return branch of the circuit.

Photographic records made on an apparatus, according to the invention, with a transparent cylindrical body and covers and in which existed two colorless phases, water and air, have shown that, at convenient rates of revolution of the planetary mechanism, the mixture in the apparatus is a white, continuous and homogeneous foam over its entire volume.

These photographs demonstrate that the contacting of the present phases is superior to that achieved in the known apparatuses and that it leads to a highly advanced mass transfer in physical and chemical processes taking place in this apparatus. They also show that the hydrodynamic contacting processes are uniform over the entire working zone of the apparatus.

These processes may be used in: mixing, evaporating, drying, absorbing and desorbing and in various chemical reactions; outstanding results are recorded especially when gaseous phases are also present.

The body of the apparatus, the shafts, the blades and the planetary gears are made of materials resistant to corrosion caused by the substances introduced and produced in the apparatus, the materials including: metals, alloys, synthetic resins, possibly only as coatings upon the surfaces coming into contact with the substances present in the apparatus.

SPECIFIC DESCRIPTION AND EXAMPLES

Figure 1:
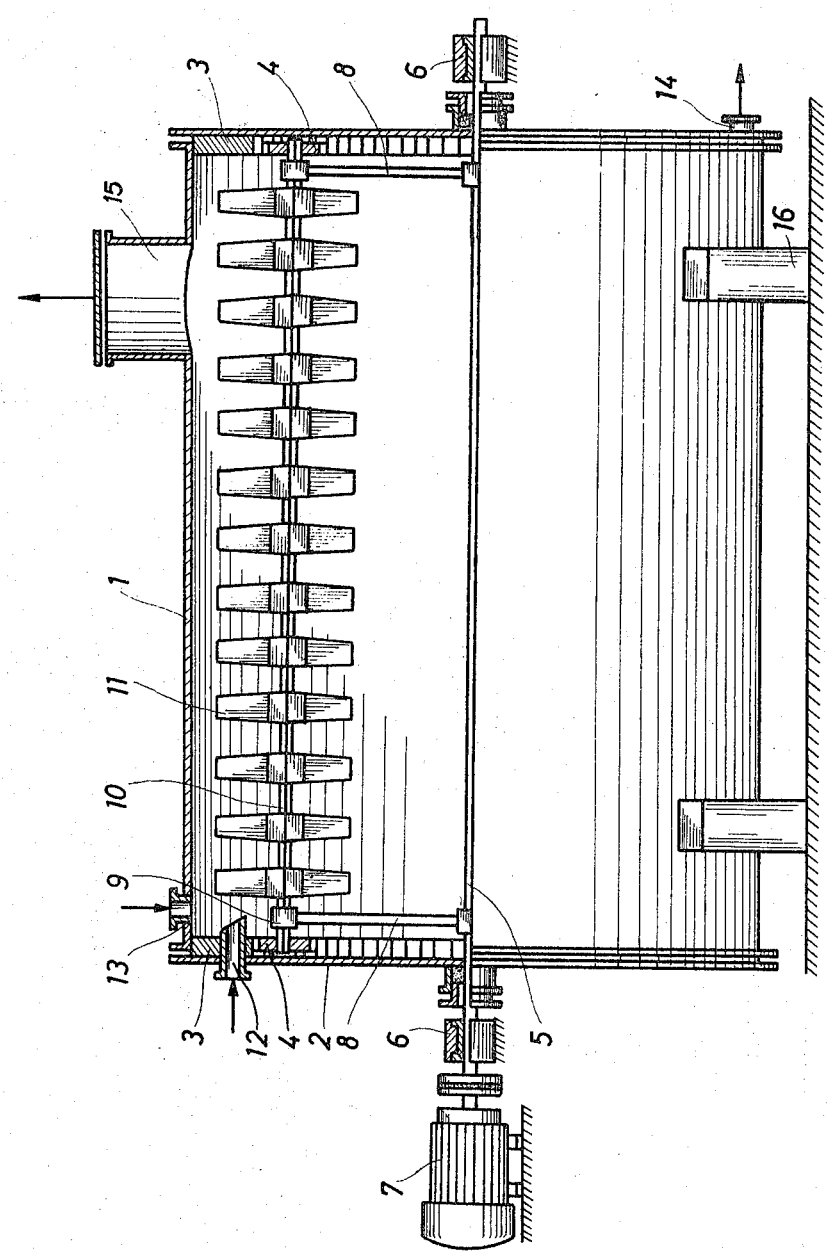
FIG. 1 is a side view of a contacting apparatus, with the upper part in section and with a satellite shaft with blades in the uppermost position.

EXAMPLE 1.

The apparatus presented for the continuous contacting of two or more phases, has a horizontal cylindrical body, a circular cross section, only one driving shaft, without blades, and three satellite shafts with blades, one of which is shown.

The contacting apparatus consists of a horizontal cylindrical body 1, with plane frontal detachable hoods 2. On the interiors of these hoods are fastened the crown gears 3, which are in mesh with the satellite toothed wheels 4. On the drive shaft 5, rotating in bearings 6 and driven by the electric motor 7, are arms 8 secured to the drive shaft. The arms are provided with terminal bearings 9, in which rotate the satellite shafts 10. Two-armed blades 11 are carried by shafts 10. The blades 11 are located at equal distances (equispacing) along the entire length of the shafts 10 and with the arms in the same plane, as in FIG. 1, or arranged so that each successive blade has its arms on a plane different from that of its neighbors or according to some other regular distribution. The shafts 10 carry satellite toothed wheels 4 at both ends.

The various phases to be contacted with one another are supplied through nozzles 12, 13, located on the frontal hoods or at the ends of the cylindrical body. The withdrawal of the phase mixture, in general, takes place at the other end, through nozzle 14. Possible residual gases are evacuated through the dome 15 which may be provided with a drip flap. The apparatus is carried by supports 16.

When the central shaft 5 rotates, the cylindrical body 1 remains fixed while the satellite shafts 10 and their blades execute a rotary motion around both the central shaft 5 and their own symmetry axes, in a sense opposite to that of the rotation of the central shaft.

Instead of the gear crowns 3 for the revolving of the satellite shafts, the apparatus may be provided with central toothed wheels, with which mesh the satellite gear wheels 4. In this case, the satellite shafts and their blades carry out motions in the same sense as the rotary motion of the central shaft.

It is understood that the apparatus may also be used with a shaft 5 which does not rotate (i.e. is fixed), but with the cylindrical body 1, together with its hoods 2, rotating on sliding blocks or otherwise, and with corresponding feeding and withdrawal of the various phases.

EXAMPLE 2

Figure 2:
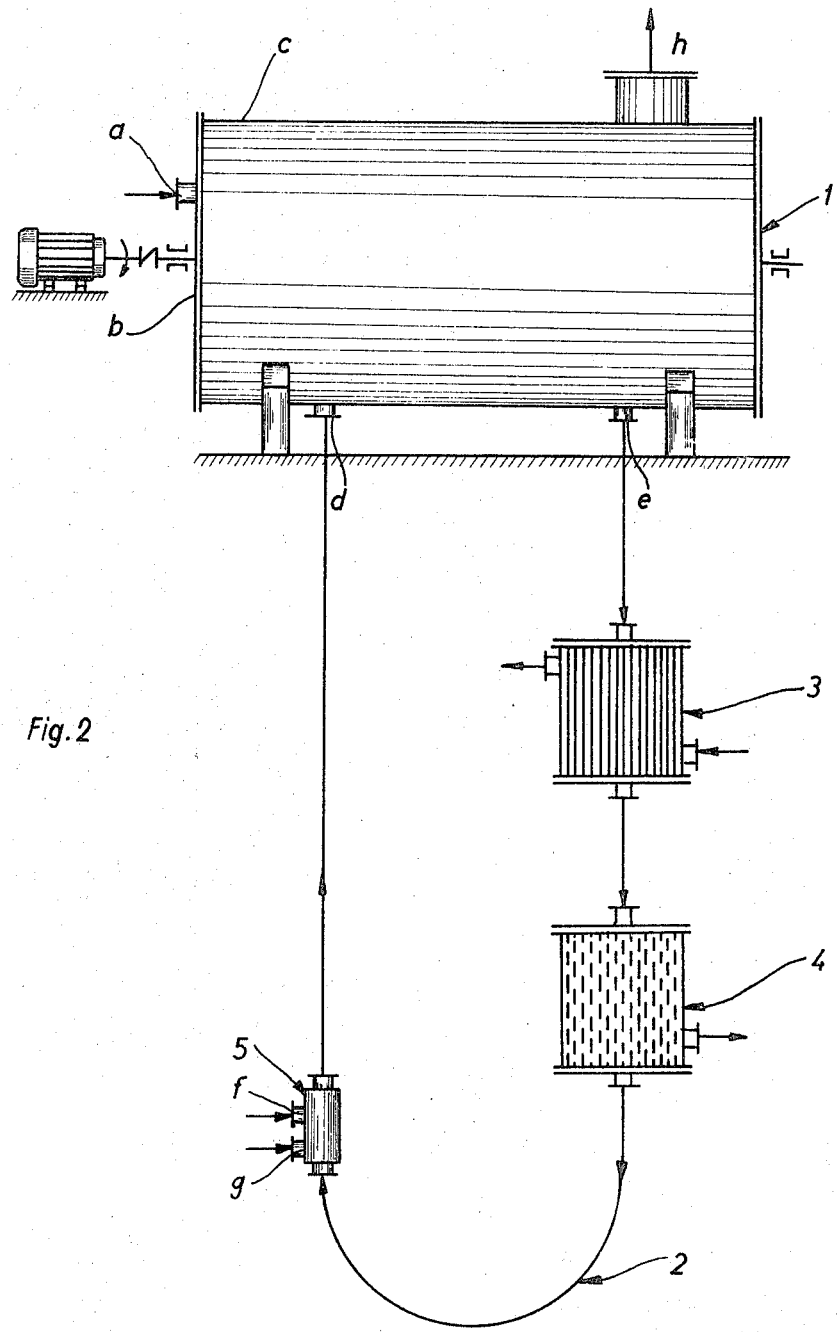
FIG. 2 is a diagram of a plant, showing the application of the apparatus shown in FIG. 1 with an external circuit for the removal of the reaction heat.

The contacting apparatus shown in FIG. 1 is used in the catalytic synthesis of hydroxylamine, from nitrogen monoxide and hydrogen, in an acid medium, using the scheme shown in FIG. 2.

Through the nozzle $a$ of the frontal hood $b$, is fed dilute sulphuric acid, used as the reaction medium. At the ends of the cover part of the cylindrical body $c$, are located nozzles $d$ and $e$, to which is connected the external circuit 2, for cooling, recycling and feeding of the gaseous reactants. Through nozzle $e$ and circuit 2, the hot liquid-solid reaction mixture is withdrawn from the apparatus 1 and introduced into the heat exchanger 3. The mixture is cooled in the latter and passed into a candle filter 4, from which is extracted continuously the hydroxylamine sulphate solution, at the flow rate produced by the installation. The liquid-solid mixture remaining after filtration, enters the Mammoth pump 5, into which are fed the reacting gases, nitrogen monoxide, through nozzle $f$, and hydrogen, through nozzle $g$. These gases serve also for the gas-lifting of the gas-liquid-solid mixture into the apparatus.

The synthesis reaction of hydroxylamine sulphate takes place in the contacting apparatus 1, in the presence of a platinum catalyst deposited on graphite powder, at a temperature of 25°–30°C and a pressure of 2.5 atmospheres absolute.

The unreacted gases are continuously eliminated through the dome $h$, provided with a drip flap.

Into a pilot apparatus, with the apparatus 1 having a capacity of 22 liters, charged with 12 liters of aqueous solution of 25 percent sulphuric acid and 60 grams of Pt catalyst on graphite, and with operating planetary mechanisms, are fed, through the body 5 of the Mammoth pump, nitrogen monoxide and hydrogen (in the stoichiometric ratio required for hydroxylamine synthesis) while the non-reacted gases are discharged through dome $h$, until a working concentration of 97 g hydroxylamine per liter is achieved in the solution processed at filter 4. This concentration is required for the use of hydroxylamine in the subsequent cyclohexanone oximation operation.

When this concentration is reached the continuous feeding of 25 percent sulphuric acid commences as well as the continuous feeding of gases NO and $H_2$, controlled by a pressure regulator in the apparatus, at a value of 2.5 atm absolute; a flow of hydroxylamine sulphate solution is removed continuously from filter 4, a solution which contains integrally the fed-in sulphuric acid. In the installation are maintained a working concentration of 97 g hydroxylamine per liter, a pressure of 2.5 atm absolute and a temperature of 20°–30°C.

Using the conditions described above, results in an average consumption of the reactant gases, of 20 l/minute (STP), which greatly exceeds that obtained in the known apparatuses.

The catalytic synthesis of hydroxylamine under the conditions described above, can be achieved, with results superior to those known, and using, as raw materials, nitrogen dioxide, nitrogen trioxide, nitric acid, nitrate ion and alkyl nitrites, instead of nitrogen monoxide.

EXAMPLE 3

During the operation of the apparatus shown in FIG. 2, nitrogen monoxide is absorbed continuously in a batch of 12.5 liters saturated and acidified ferrous sulphate solution, at a pressure of 1.1 atm absolute, and a temperature of 15°C.

The absorbing rate of nitrogen monoxide, in the first 15 seconds of experimentation, was 400 l/minute (STP). This speed achieved is about 80 times higher than that obtained in an absorption column having the same volume as that of the apparatus 1 of the installation.

EXAMPLE 4

The apparatus shown in FIG. 2 is in operation; 5 kg adipic acid, with an initial humidity of 20 percent, is subjected to drying in a current of hot air, introduced through nozzle a, which maintained a temperature of 105°C in the working apparatus. After 20 minutes, the adipic acid contained a residual humidity of only 0.05 percent.

The utilization of the process and of the apparatus, according to the invention, offers several advantages. For example, it ensures the achievement of much higher productivity than the known apparatuses for the contacting of phases, and it facilitates the commercial-scale extrapolation of the researches carried out on a small scale.

I claim:

1. An apparatus for the continuous contacting of at least two different reaction phases comprising:
   a housing having a generally horizontal axis;
   at least one inlet for reactants opening into said housing;
   at least one outlet for products leading from said housing;
   a central axial shaft rotable in said housing;
   at least one planetary agitator in said housing, said agitator comprising:
   a planetary gear within said housing,
   a planetary shaft within said housing operatively connected to said gear, and
   a plurality of axially spaced radially projecting blades mounted on said planetary shaft and orbiting short of said central shaft;
   a pair of generally radial arms fixed to said central shaft and projecting therefrom;
   means for journaling said planetary shaft on the free ends of said arms and radially spaced from said central shaft;
   a gear fixed in said housing meshing with said planetary gear for rotating said planetary shaft upon orbital motion of the planetary gear; and
   means for rotating relatively said housing and said central shaft to cause said planetary shaft to rotate about its axis and simultaneously to orbit said central shaft.

2. The apparatus defined in claim 1 wherein said central shaft is driven, said housing is horizontal and cylindrical, a plurality of planetary agitators are provided in said housing and are connected to said central shaft, each of the planetary shafts of the agitators carries a respective planetary gear at the opposite ends thereof, and respective fixed gears are provided at the opposite ends of said housing in mesh with the planetary gears at the opposite ends of said planetary shafts.

3. The apparatus defined in claim 1 wherein said planetary shaft is provided with a multiplicity of axially spaced, generally radial, blades separated by equal distances.

4. The apparatus defined in claim 1 wherein said fixed gear is a ring gear.

5. The apparatus defined in claim 1, further comprising a circuit, externally of and connected to said housing, said circuit including:
   means for effecting heat exchange of a mixture of phases with a heat-exchange fluid,
   means for filtering and separating said mixture of phases to recover a product,
   means for pumping said mixture of phases exclusive of the product back to said housing, and
   means for introducing reactant gases into said housing.

6. A process for the contacting of phases comprising the steps of:
   injecting a liquid reactant system into an apparatus for contacting phases;
   pumping at least one gaseous reactant into said apparatus;
   contacting reactants present in said apparatus to form a reaction mixture, said mixture reacting to form a product in a mixture of phases, by inducing planetary motion and agitation thereof by
   rotating at least one planetary shaft provided with blades in said apparatus with orbital motion, and
   revolving said shaft on its axis while in orbital motion;
   evacuating residual gases from the apparatus;
   removing said mixture of phases from said apparatus;
   cooling said mixture of phases;
   filtering said cooled mixture of phases of separate said product from said mixture of phases; and
   returning said mixture of phases exclusive of the product to said apparatus.

* * * * *